(12) United States Patent
Green

(10) Patent No.: US 8,413,085 B2
(45) Date of Patent: Apr. 2, 2013

(54) DIGITAL NETLIST PARTITIONING SYSTEM FOR FASTER CIRCUIT REVERSE-ENGINEERING

(75) Inventor: Michael Green, Ottawa (CA)

(73) Assignee: Chipworks Inc., Ottawa, Ontario (CA)

( * ) Notice: Subject to any disclaimer, the term of this patent is extended or adjusted under 35 U.S.C. 154(b) by 0 days.

(21) Appl. No.: 13/083,534

(22) Filed: Apr. 9, 2011

(65) Prior Publication Data

US 2012/0260224 A1 Oct. 11, 2012

(51) Int. Cl.
*G06F 17/50* (2006.01)
(52) U.S. Cl. ........... 716/103; 716/106; 716/139; 703/14
(58) Field of Classification Search .......... 716/103, 716/106, 139; 703/14
See application file for complete search history.

(56) References Cited

U.S. PATENT DOCUMENTS

| | | | | |
|---|---|---|---|---|
| 5,452,239 A * | 9/1995 | Dai et al. | | 703/19 |
| 5,638,380 A * | 6/1997 | De | | 714/726 |
| 5,640,403 A * | 6/1997 | Ishiyama et al. | | 714/737 |
| 6,295,517 B1 * | 9/2001 | Roy et al. | | 703/15 |
| 6,374,205 B1 * | 4/2002 | Kuribayashi et al. | | 703/14 |
| 6,440,780 B1 * | 8/2002 | Kimura et al. | | 438/129 |
| 6,470,480 B2 * | 10/2002 | Ganesan et al. | | 716/106 |
| 6,704,916 B1 * | 3/2004 | Nishida et al. | | 716/108 |
| 6,714,902 B1 * | 3/2004 | Chao et al. | | 703/14 |
| 7,272,805 B2 * | 9/2007 | McGaughy et al. | | 716/103 |
| 7,653,884 B2 * | 1/2010 | Furnish et al. | | 716/103 |
| 7,752,588 B2 * | 7/2010 | Bose | | 716/122 |
| 7,810,063 B1 * | 10/2010 | Sharma et al. | | 716/139 |
| 7,945,875 B2 * | 5/2011 | Anand et al. | | 716/103 |
| 8,086,982 B2 * | 12/2011 | Chang et al. | | 716/114 |
| 2003/0188273 A1 * | 10/2003 | Kundu et al. | | 716/4 |
| 2003/0200073 A1 * | 10/2003 | Rich et al. | | 703/17 |
| 2004/0117167 A1 * | 6/2004 | Neifert et al. | | 703/14 |
| 2006/0117274 A1 * | 6/2006 | Tseng et al. | | 716/1 |

* cited by examiner

*Primary Examiner* — Naum Levin
(74) *Attorney, Agent, or Firm* — Kent Daniels; Daniels IP Services Ltd.

(57) ABSTRACT

Methods and systems are provided to reduce the complexity of sequential digital circuitry including cells of unknown function by grouping and defining like instance of combinational circuitry cells. The system groups together cells that feed into the same combination of one or more state cells. The groups of cells are then replaced by clouds which are defined in the netlist for the sequential digital circuitry to produce a simpler representation of the circuitry for analysis purposes and to aid in determining the function of those cells for which the function is unknown.

18 Claims, 7 Drawing Sheets

DIGITAL NETLIST PARTITIONING SYSTEM FOR FASTER CIRCUIT REVERSE-ENGINEERING

BACKGROUND

1. Technical Field

Various embodiments of the present invention relate to circuitry analysis tools, and more specifically, to a circuitry analysis tool for reverse engineering a circuit design.

2. Description of Related Art

Engineers often need to organize electrical circuits to understand how they function. Essentially, circuits consist of cells, and connections between cells. Chipworks has tools which allow an engineer to group logic cells together based on connections between them. For a circuit that is simple with a small number of components and connections the engineer may arrive at a plausible organization of the entire circuit in a reasonable amount of time. However, as the number of cells and connections grows, the conventional method becomes increasingly difficult to use. For example, a modest digital circuit may contain tens of thousands of components, and at least as many connections between them. Grouping logic cells by tracing connections one-by-one is not practical for large circuits such as this. It takes far too much time. This inefficiency and delay may have further consequences for the business inasmuch as it may cause projects to take too long to complete and cost too much. Project costs tend to increase proportionally, a factor that may deter sales for large projects.

BRIEF SUMMARY

Various embodiments of the present invention involve methods, systems and computer products for reducing the complexity of a sequential digital circuit containing at least some circuitry elements of unknown function. Once circuitry with multiple cells—including some cells of unknown function—is provided for analysis, the system categorizes each of the cells as either a combinational cell or a state cell. The system traces back from the first state cell to identify a first combinational cell group among the combinational cells that each affect a same portion of the plurality of state cells. The identified first combinational cell group is then replaced with a first cloud.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings.

DETAILED DESCRIPTION

Figure 1:
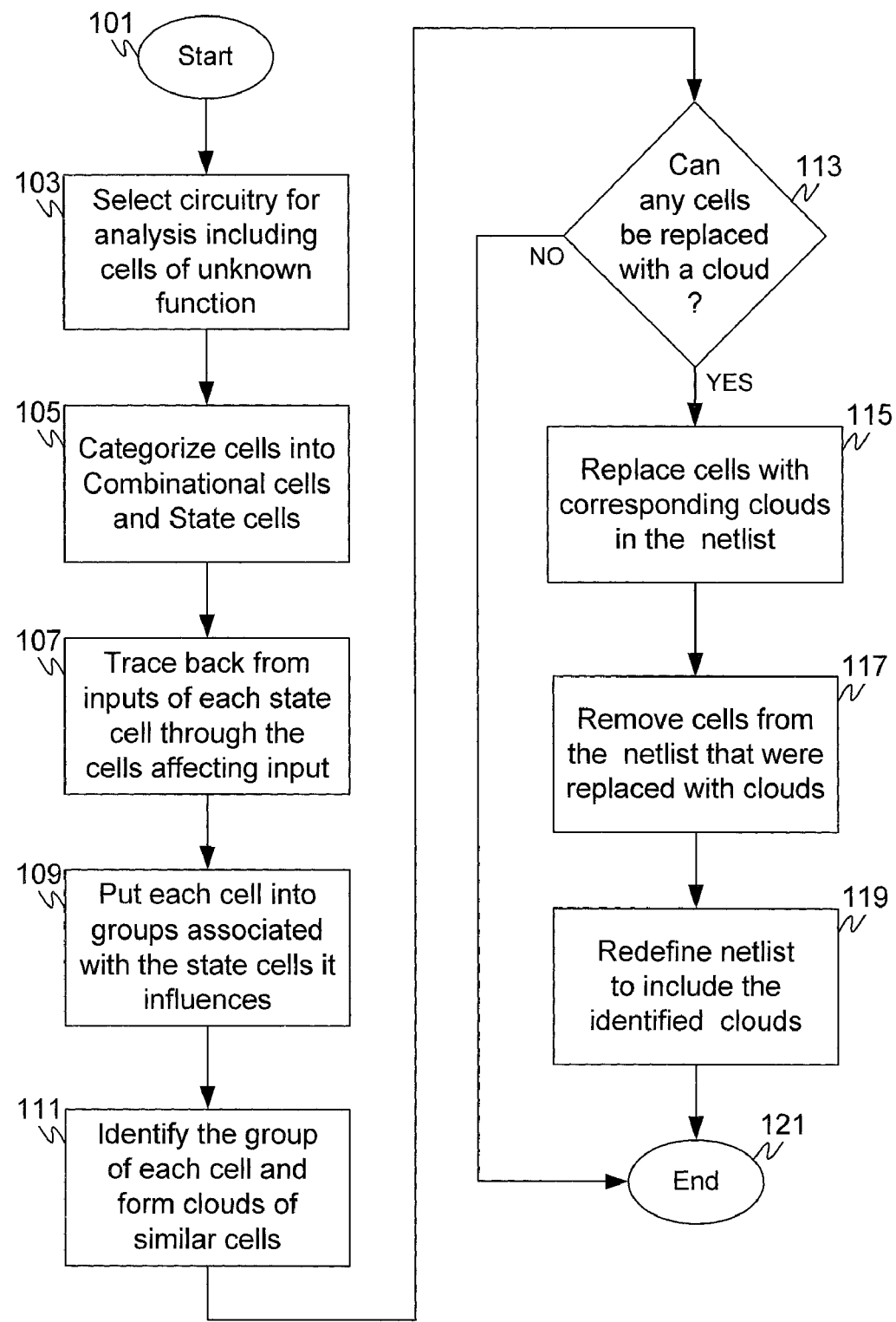
FIG. 1 is a flowchart for a method of practicing various embodiments.

FIG. 1 is a flowchart for a method of practicing various embodiments. The various embodiments disclosed herein involve systems and methods for analyzing an existing circuit design in which some or all of the functions of the circuitry are unknown. The various embodiments can rapidly group related logic cells with little or no human intervention. By using the various embodiments the engineers need only concern themselves with moving the groups, not the individual logic cells. It is not unusual for a group to contain many logic cells. By treating the group as an atomic entity, engineers often see a marked decrease in the number of logic cells to be arranged. Furthermore, grouping logic cells effectively removes the groups' internal nets from consideration when organizing the top-level circuit. These two reductions provide a type of netlist compression. After reducing both the number of logic cells and connections in this manner, the circuit is much simpler than before, allowing engineers to apply conventional analysis methods to the circuitry. As such, the various embodiments disclosed herein extend the capabilities of conventional methodologies to cover circuits which are much more complex than those thought to be feasible for conventional systems.

FIG. 2 depicts an example circuit in which the circles represent combinational cells, the rectangles represent state cells, and the lines between them represent connections. Although not indicated in the figure, the signals flow from left to right in this example. In other words, the component on the left side of a connection is the driver, while the component on the right side of the connection consumes the driver's output. In this example, combinational cells can have more than one input and more than one output, although this may not always be the case for the various components encountered in real world implementations of the system.

Turning to FIG. 1 again, the method begins at block 101 and proceeds to 103 to select circuitry of a sequential digital system for analysis. A sequential digital system may have tens of thousands of circuitry cells, or even millions of cells, depending upon the complexity of the circuit. The various embodiments may be used to analyze the function of an entire sequential digital system, or a subset of the system circuitry. The selected circuitry may be provided to the system in a number of different formats. For example, a netlist is one common way of communicating circuit information. A netlist describes the connectivity of an electronic design, and lists the components or cells of the circuit. Once the circuitry has been selected for analysis in 103 the method proceeds to block 105.

In block 105 of FIG. 1 the cells are categorized into combinational cells and state cells. The logic cells in a sequential digital system include two types of circuitry, combinational cells and state cells. A combinational logic cell is a simple cell which does not hold any state information. A combinational logic cell may include one or more discrete electronic components (e.g., transistors, capacitors, inductors, resistors, or the like). A state cell is a component or combination of components with the ability to store state, or status information (e.g., a digital "1" or "0"). This state value is typically based on current and past inputs, and the current values of other state cells A state cell can respond to a change in input by changing its state in a predefined manner. A state cell is typically any cell which is not a combinational cell. It should be noted that the various embodiments involve the analysis of cells with unknown functions. Therefore, for the purposes of the present discussion, a state cell may be a group of cells organized by an engineer and defined as a state cell, regardless of the group's actual function (which may later be discovered). Some examples of state cells include a flip-flop, a memory macro, an analog block, a pad, a previously-organized scan chain cell, and/or a previously-organized clock tree buffer or gate cell. A group of cells selected for analysis is depicted in FIG.

2A. In the example illustrated in FIG. 2 cells 1-6 are state cells (the rectangular cells). The cells connecting state cells 1-3 to state cells 4-6—that is, the round cells—are combinational cells. Returning to 105 of FIG. 1, performing block 105 results in the cells of the selected circuitry being categorized into two groups, a group of combinational cells and a group of state cells.

Upon completing 105 the method proceeds to 107 to trace from the inputs of state cells, back through the combinational cells. This is done by tracing back from each state cell to identify a group of combinational cells that each affect a same portion of the state cells—that is, identify groups of combinational cells that affect the same state cell or group of state cells. The tracing may begin by finding the driver for each state cell. For a given state cell the system traces back through the driver(s) of that state cell. Any given state cells may have only one driver (e.g., combination cell that feeds into the state cell's input), or may have multiple drivers, all of which are directly connected to inputs of that state cell. Therefore, it is often useful to use a unique label for each driver. Once the driver(s) directly feeding into the state cell are identified, the system traces through its (their) drivers, and so on. The system labels each combinational cell as it is visited with a label or tag identifying the state cell from which the tracing began. The tracing of a given branch stops upon reaching the output of a state cell. In this way the combinational cells are identified feeding into the input of a state cell back through the circuitry until the output of a state cell is reached.

Figure 2A:
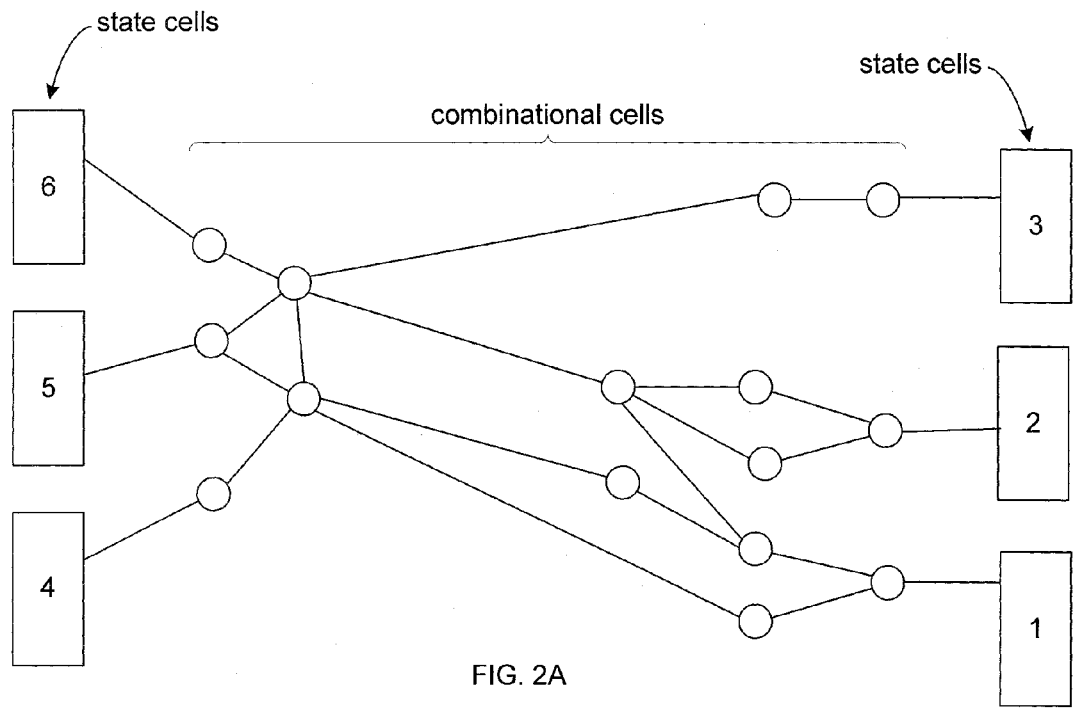
FIGS. 2A-H depicts examples of circuitry being reduced according to various embodiments.
Figure 2B:
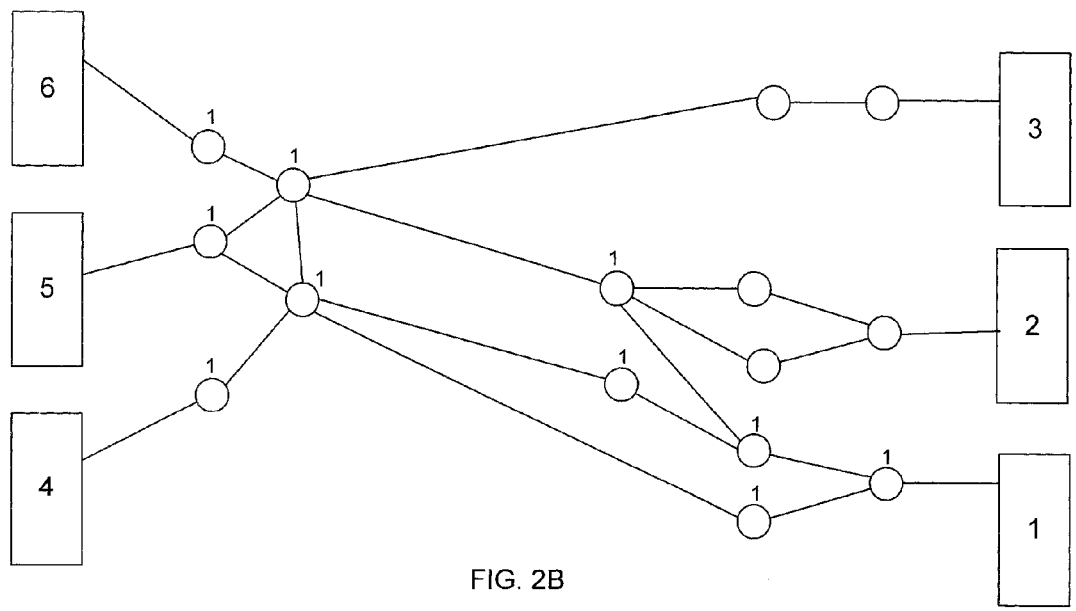
Figure 2C:
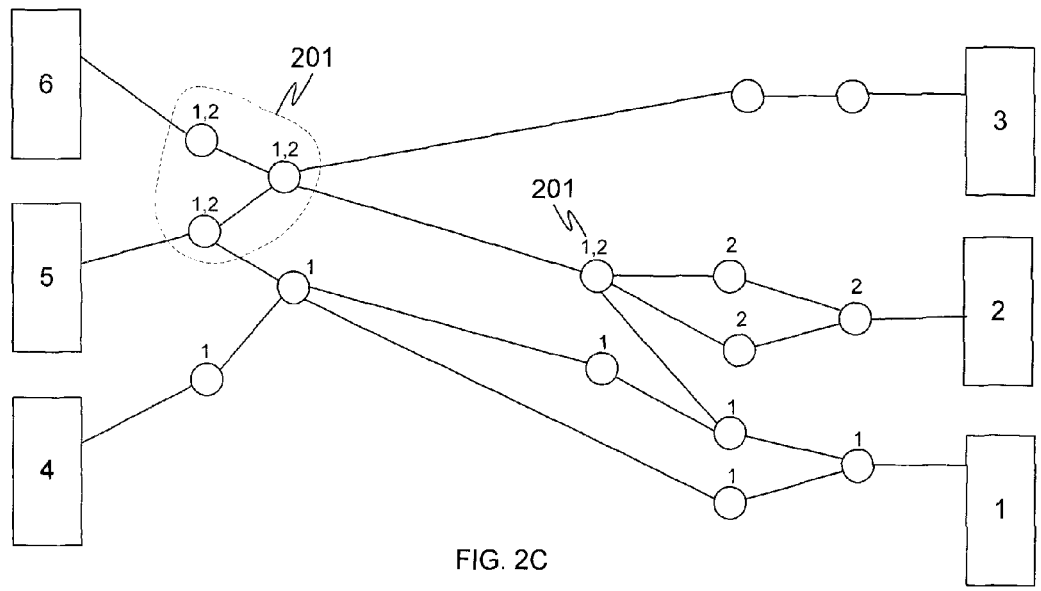
Figure 2D:
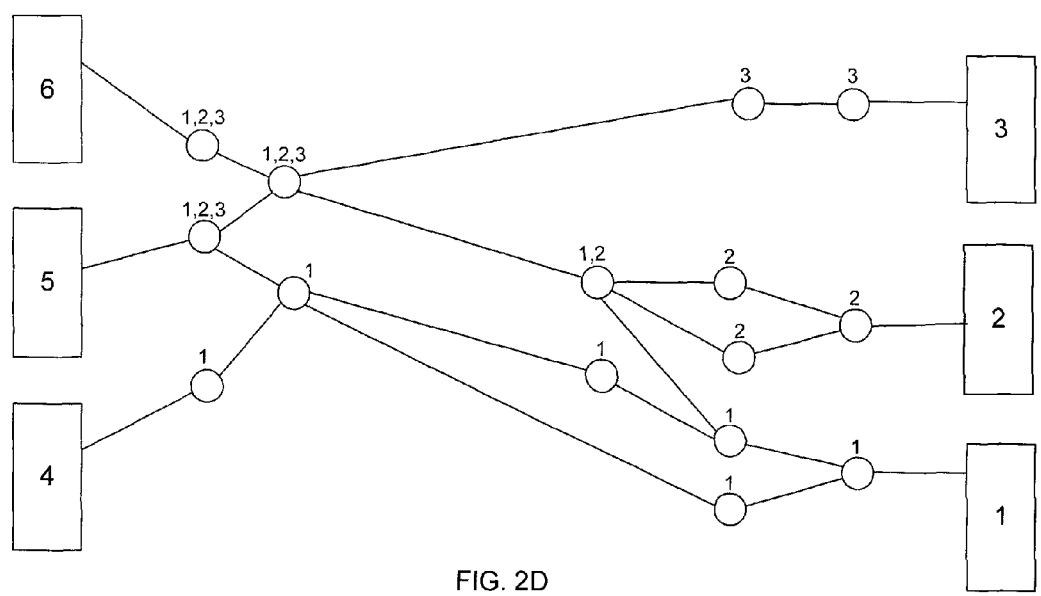

The tracing of drivers for state cell 1 is illustrated in FIG. 2B. Working back from the input to state cell 1 all of the round combinational cells are categorized with a "1" indicating that these cells feed into the input of state cell 1. This process is performed for each input of each state cell being analyzed. In FIG. 2C the combinational cells have been analyzed to characterize those cells that feed into the input of state cell 2. The combinational cells 201 of FIG. 2C are labeled "1,2" indicating that these combinational cells feed into the input of state cell 1 and also state cell 2. In FIG. 2D the combination cell tracing is completed for the three state cells 1, 2 and 3. The combinational cells labeled "1,2,3" feed into the inputs of each of state cells 1, 2 and 3. Upon completing block 107 to trace from the inputs of state cells, back through the combinational cells the method proceeds to 109.

Figure 2E:
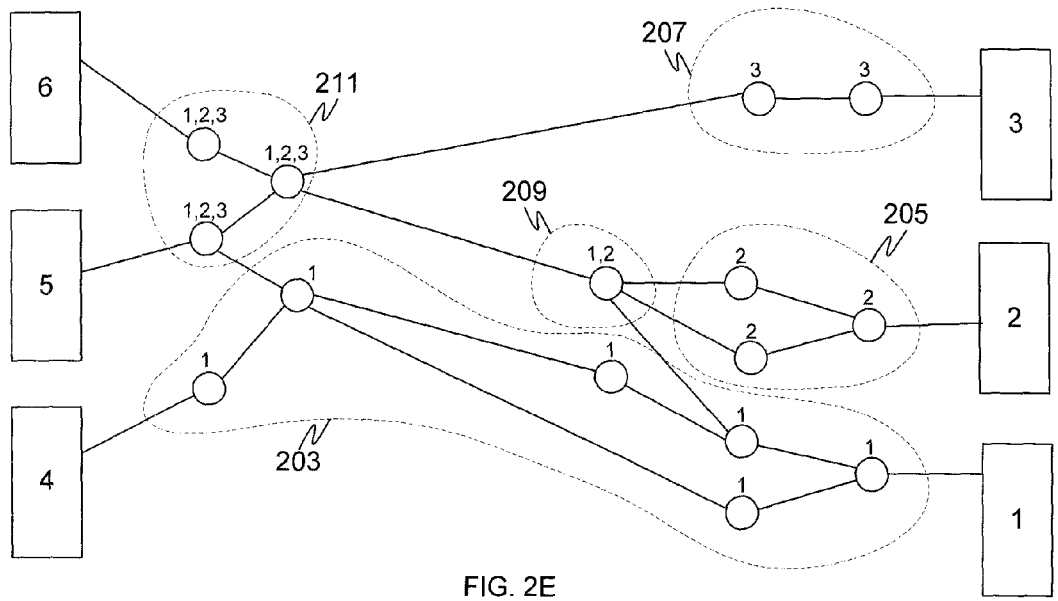

In block 109 the combinational cells are grouped according to the state cell(s) they affect. To do this the system finds all unique group labels based on the group labels formed during step 107, and forms groups of components based on which labels were assigned to each component. As shown in FIG. 2E the combinational cells feeding only into state cell 1 are grouped in 203, the combinational cells feeding only into state cell 2 are grouped in 205, the combinational cells feeding only into state cell 3 are grouped in 207, the combinational cells feeding into both state cells 1 and 2 are grouped in 209, and the combinational cells feeding into all three of state cells 1, 2 and 3 are grouped in 211. A convenient way to accomplish this grouping is to sort each component's labels and join them together with a delimiter character to form a string. The system can then create an entry in an associative array whose key is this "signature" string and whose value is a list of all components having this signature. Iterate through all combinational components, calculating signatures and adding keys and values to the associative array. In the end, there is one key in the array corresponding to each unique grouping, and that key's value is the list of components belonging to that group. Once the grouping of the combinational cells in 109 is completed the method proceeds to 111.

Figure 2F:
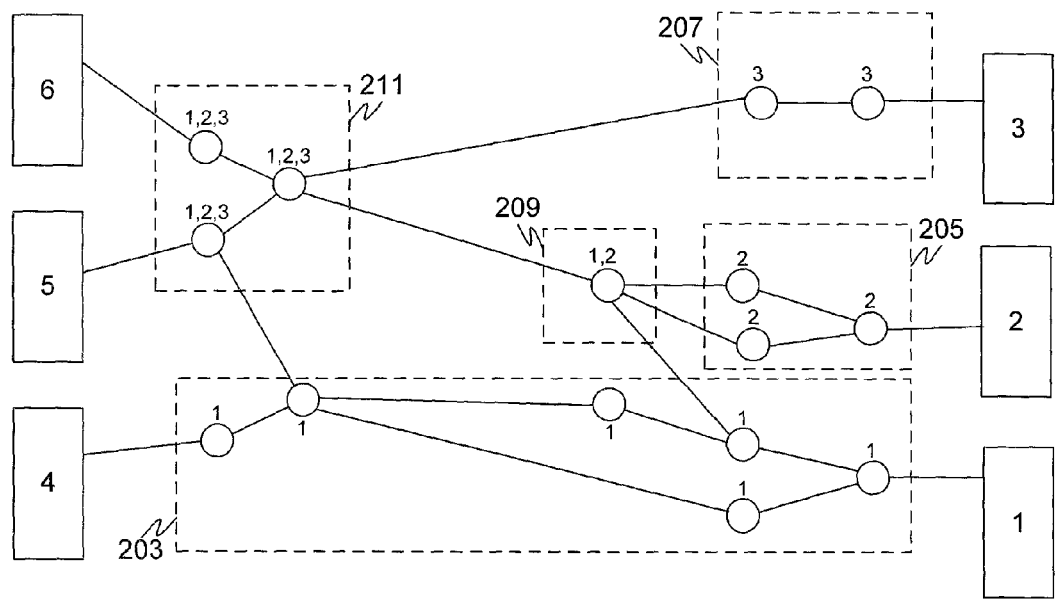

Blocks 111 through 115 of FIG. 1 entail partitioning the groups of combinational cells identified in 109. This is done by identifying the group each cell belongs to in block 111, forming a cloud consisting of the cells in that group in block 113, and replacing the cells with the cloud(s) in block 115. A cloud is a logical construct that can be used to replace a number of cells in the representation of the digital circuit, for analysis purposes. While the actual (real world) circuitry elements may not be changed, the analysis often becomes more efficient if a number of elements are represented by a cloud. In some embodiments the cloud may then be included in a reduced netlist for the digital circuit, thus simplifying the netlist. If a partition ends up containing only one cell, the system typically does not bother to create a label (or logic cloud) for it. Instead, it leaves the single, unique combinational cell untouched on the top-level circuit. Generating a logic cloud in this case would not be useful in reducing the circuit, and it would tend to obscure details of the cell. In the event it is determined in 113 that no cells can be replaced by a cloud the method proceeds along the "NO" branch to 121 and ends. However, generally complex circuitry with a number of combinational cells is subject to reduction using the various embodiments disclosed here. For such cases when it is determined in 113 that at least some of the cells in the selected circuitry can be replaced by a cloud, the method proceeds from 113 along the "YES" branch to 115. In block 115 the identified cells are replaced by clouds. That is, all the combinational cells having the same connection characteristics are grouped together and placed into one cloud. For example, FIG. 2F shows that all the combinational cells that affect the input value of state cells 1,2, and 3 are grouped into cloud 211. The combinational cells that only affect the input value of state cell 1 input are grouped together in cloud 203. Upon completing 115 the method proceeds to 117.

Figure 2G:
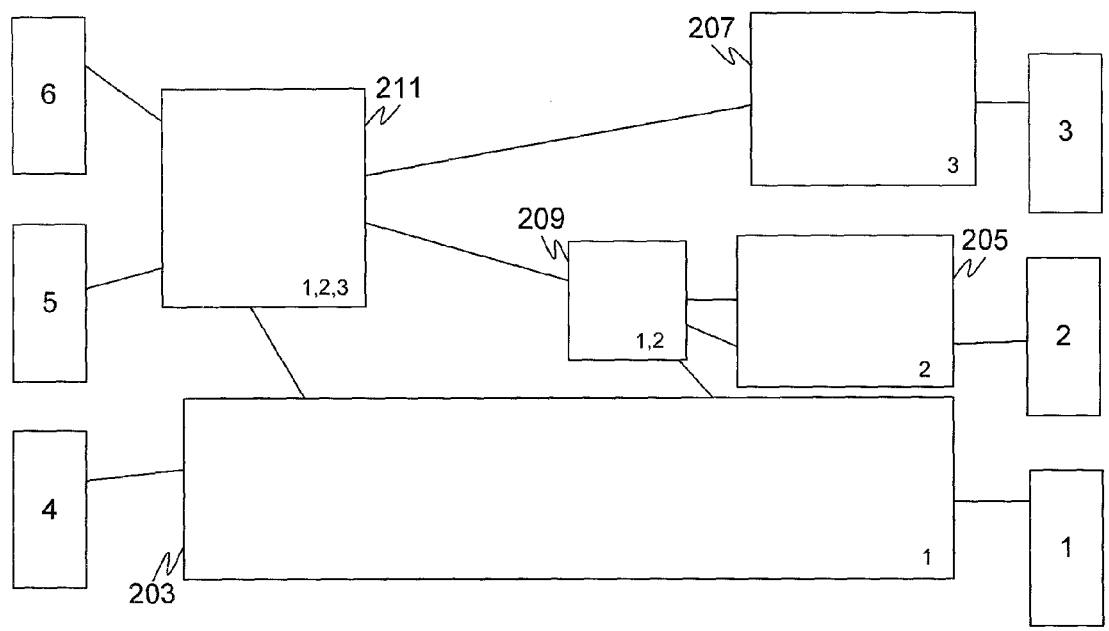
Figure 2H:
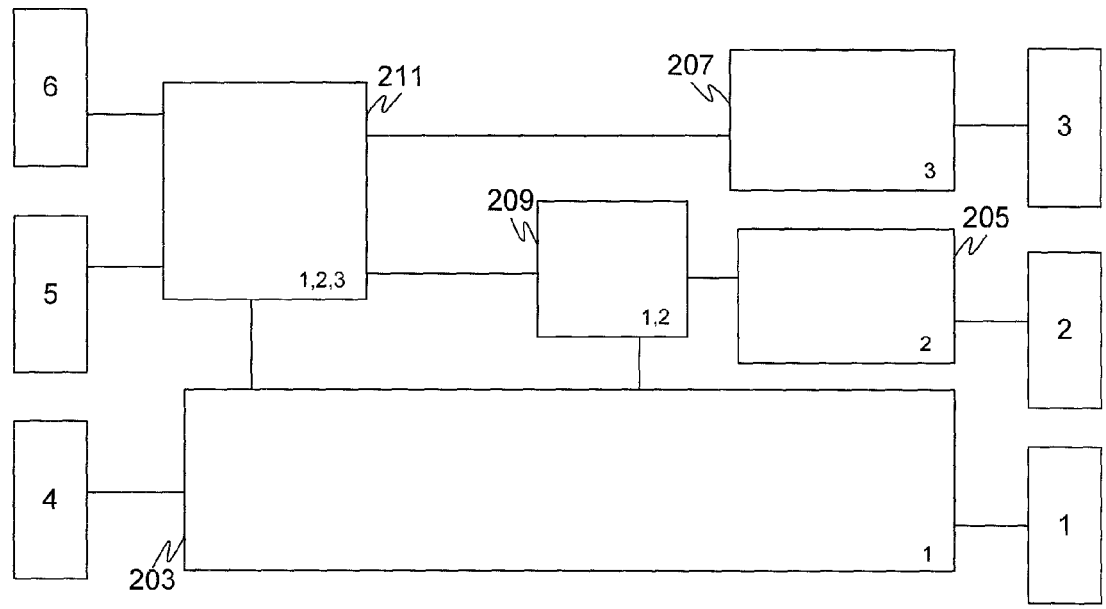

In block 117 the individual cells are removed from the netlist, leaving a simplified circuit including one or more clouds. As shown in FIG. 2G the individual cells have been removed, leaving only the clouds. For convenience, the cell labels have been left on each cloud in the figure (e.g., 1,2,3, 1,2, 1, etc.). Part of block 117 may entail reconfiguring the inputs and outputs of the various clouds in the circuit. FIG. 2H depicts the selected circuit, now consisting of clouds, with the connectors redrawn for clarity and ease of analysis. In the simplified cloud version of the circuit a connector line may represent multiple connections between the combinational cells. For example, FIG. 2G shows two connectors lines drawn between cloud 209 (the 1,2 cloud) and cloud 205 (the 2 cloud). In FIG. 2H the two connector lines have been reduced to one line representing both connections. In some embodiments the connector lines representing multiple connections may be drawn in a different manner to indicate multiple connections (or the number of multiple connections). For example, the multiple connection lines may be drawn thicker than single connection lines, or with another visual indicator, e.g., cross-hatched, color coded, or the like. Upon completing 117 to remove the individual cells that were replaced with clouds the method then proceeds to 119.

In block 119 the netlist is redefined to list clouds rather than individual cells. In some embodiments it may be the case that the netlist consists of a number of clouds along with one or more individual cells. Other embodiments may include clouds consisting of only one combinational cell. Either method may be used, depending upon the agreed upon conventions and needs of the engineers analyzing the circuit. Once the combinational cells have been replaced with clouds in 119 the method proceeds to 121 and ends.

The example circuit outlined in conjunction with FIG. 1 and FIGS. 2A-H reduced 15 cells to 4 logic clouds, and 24 nets to 10 nets. The gates are, however, more complex. The engineers analyzing this circuit may employ a digital simulator with the reduced result to help understand the functions of the logic clouds. In a real world analysis, the inventors were able to use a system employing the present embodiments to reduce a circuit containing 6,940 combinational cells to 1,136 logic clouds, a much more manageable representation of the digital circuit.

Figure 3A:
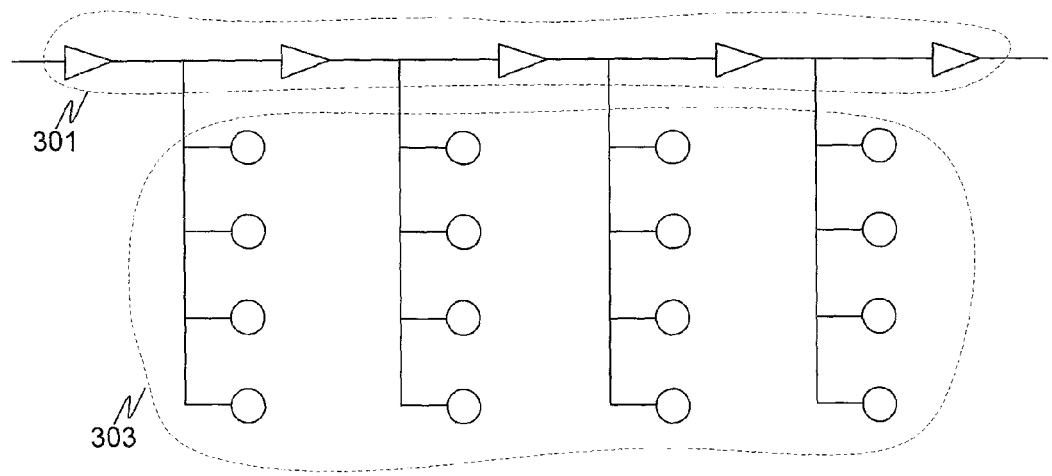
FIG. 3 depicts an example of a method that reduces buffer trees and chains.
Figure 3B:
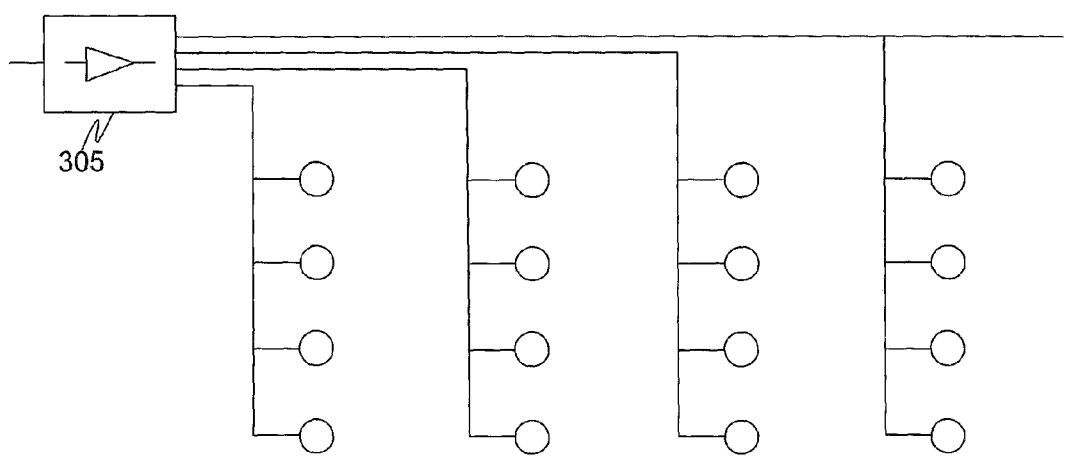

FIGS. 3A-B depict an example of a method that reduces buffer trees and chains. In some digital circuits certain signals have a very high fan-out, that is, they drive many inputs. Digital synthesis tools may insert buffers to avoid timing problems. Such buffers may be arranged in large trees. Buffers are also commonly used to introduce signal delay at specific points within the digital circuitry. This is done by arranging buffers, sometimes configured into long buffer chains, in areas where extra signal delay is desirable. Regardless of the circumstance, finding and arranging these trees or chains of buffers is time-consuming with conventional circuit analysis tools. It can sometimes be difficult to identify buffers since other components can be arranged to function as a buffer (e.g., an inverter, an OR gate, an AND gate with an input tied high, or the like). Therefore, a buffer may be identified by the functional context of the component. For example, a cell may be considered a buffer if it has only one input. A cell may also be identified as a buffer by clues in the component's labeling or naming convention. For example, a cell may be considered a buffer if its name contains the string "BUF" or "INV".

The example of FIGS. 3A-B depicts the result of a special handling method for simplifying trees and chains of buffers. The buffers are simplified by attempting to coalesce all buffers in a tree or chain into one single cell, in a way which is still compatible with the original netlist. The single buffer cell that replaces the buffers in a tree or chain may be called a cloud. FIG. 3A shows a chain of buffers where each link in the chain drives a number of non-buffer combinational cells. FIG. 3B illustrates how such a buffer chain is handled according to the buffer handling process of the present embodiment. Note that the process does not re-wire the combinational cells such that they are on the same net. To do so would break the relationship between the circuit and the top-level netlist, for example, netlist information extracted from photographs of the circuitry.

Figure 4:
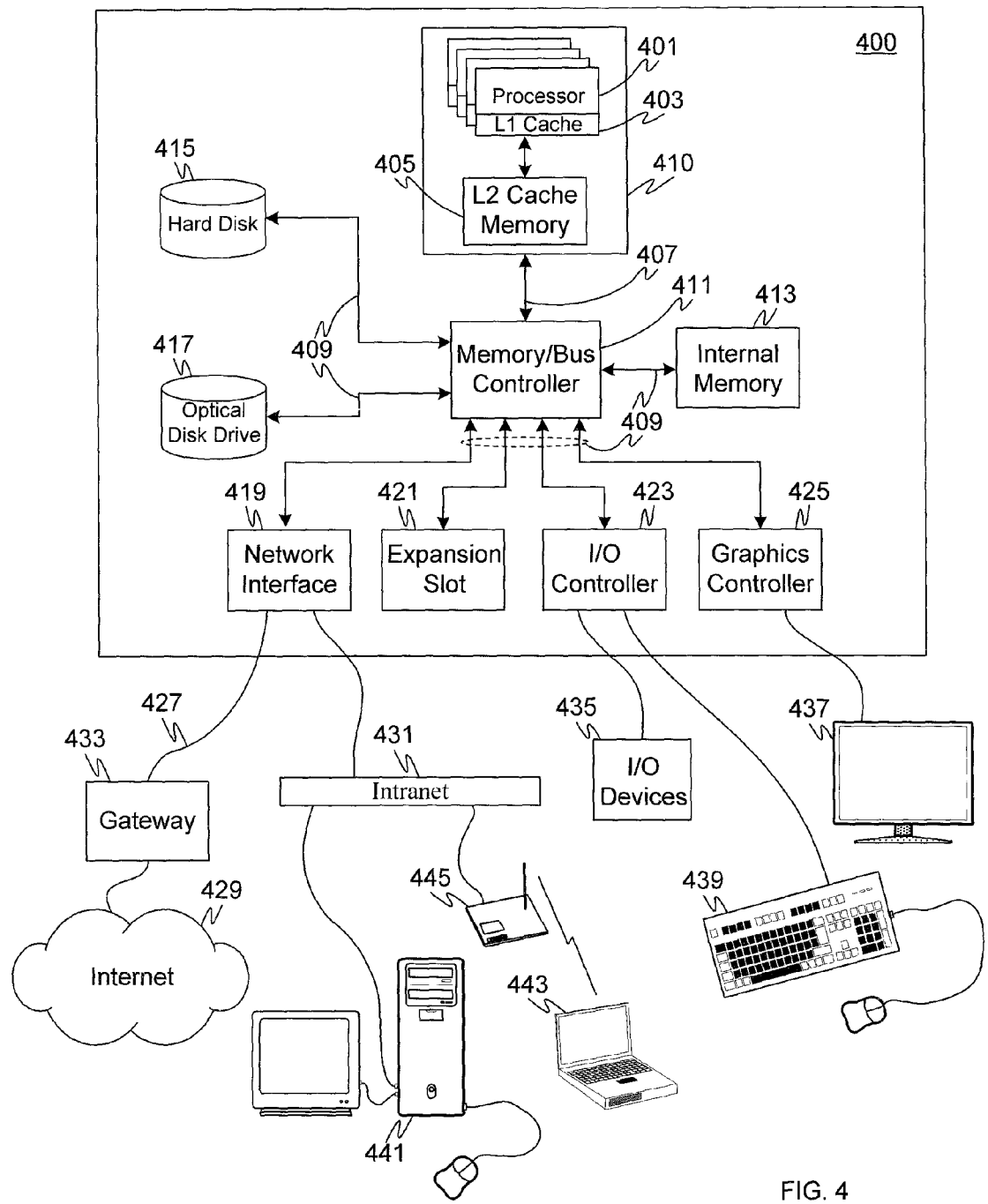
FIG. 4 depicts a computer system and associated components suitable for implementing various embodiments disclosed herein.

FIG. 4 depicts a computer system 400 and various components suitable for implementing the various embodiments disclosed herein. The computer system 400 may be configured in the form of a desktop computer, a laptop computer, a mainframe computer, or any other hardware or logic arrangement capable of being programmed or configured to carry out instructions. In some embodiments the computer system 400 may act as a server, accepting inputs from a remote user over a local area network (LAN) 427, the Internet 424, or an intranet 431. In other embodiments, the computer system 400 may function as a smart user interface device for a server on the LAN 427 or over the Internet 424. The computer system 400 may be located and interconnected in one location, or may be distributed in various locations and interconnected via communication links such as a LAN 427 or a wide area network (WAN), via the Internet 424, via the public switched telephone network (PSTN), a switching network, a cellular telephone network, a wireless link, or other such communication links. Other devices may also be suitable for implementing or practicing the embodiments, or a portion of the embodiments. Such devices include personal digital assistants (PDA), wireless handsets (e.g., a cellular telephone or pager), and other such electronic devices preferably capable of being programmed to carry out instructions or routines. Those of ordinary skill in the art may recognize that many different architectures may be suitable for the computer system 400, although only one typical architecture is depicted in FIG. 4.

Computer system 400 may include a processor 401 which may be embodied as a microprocessor, two or more parallel processors as shown in FIG. 4, a central processing unit (CPU) or other such control logic or circuitry. The processor 401 may be configured to access a local cache memory 403, and send requests for data that are not found in the local cache memory 403 across a cache bus to a second level cache memory 405. Some embodiments may integrate the processor 401, and the local cache 403 onto a single integrated circuit and other embodiments may utilize a single level cache memory or no cache memory at all. Other embodiments may integrate multiple processors 401 onto a single die and/or into a single package. Yet other embodiments may integrate multiple processors 401 with multiple local cache memories 403 with a second level cache memory 405 into a single package 410 with a front side bus 407 to communicate to a memory/bus controller 411. The memory/bus controller 411 may accept accesses from the processor(s) 401 and direct them to either the internal memory 413 or to the various input/output (I/O) busses 404. Some embodiments of the computer system 400 may include multiple processor packages 410 sharing the front-side bus 407 to the memory/bus controller. Other embodiments may have multiple processor packages 410 with independent front-side bus connections to the memory/bus controller. The memory bus controller may communicate with the internal memory 413 using a memory bus 404.

The internal memory 413 may include one or more random access memory (RAM) devices such as synchronous dynamic random access memories (SDRAM), double data rate (DDR) memories, or other volatile random access memories. The internal memory 413 may also include non-volatile memories such as electrically erasable/programmable read-only memory (EEPROM), NAND flash memory, NOR flash memory, programmable read-only memory (PROM), read-only memory (ROM), battery backed-up RAM, or other non-volatile memories. In some embodiments, the computer system 400 may also include 3rd level cache memory or a combination of these or other like types of circuitry configured to store information in a retrievable format. In some implementations the internal memory 413 may be configured as part of the processor 401, or alternatively, may be configured separate from it but within the same package 410. The processor 401 may be able to access internal memory 413 via a different bus or control lines than is used to access the other components of computer system 400.

The computer system 400 may also include, or have access to, one or more hard drives 415 (or other types of storage memory) and optical disk drives 417. Hard drives 415 and the optical disks for optical disk drives 417 are examples of machine readable (also called computer readable) media suitable for storing the final or interim results of the various embodiments. The optical disk drives 417 may include a combination of several disc drives of various formats that can read from and/or write to removable storage media (e.g., CD-R, CD-RW, DVD, DVD-R, DVD-W, DVD-RW, HD-DVD, Blu-Ray, and the like). Other forms or computer readable media that may be included in some embodiments of computer system 400 include, but are not limited to, floppy disk drives, 9-track tape drives, tape cartridge drives, solid-state drives, cassette tape recorders, paper tape readers, bubble memory devices, magnetic strip readers, punch card readers or any other type or computer useable or machine readable storage medium.

The computer system 400 may either include the hard drives 415 and optical disk drives 417 as an integral part of the computer system 400 (e.g., within the same cabinet or enclosure and/or using the same power supply), as connected peripherals, or may access the hard drives 415 and optical disk drives 415 over a network, or a combination of these. The hard drive 415 often includes a rotating magnetic medium configured for the storage and retrieval of data, computer programs or other information. In some embodiments, the hard drive 415 may be a solid state drive using semiconductor memories. In other embodiments, some other type of computer useable medium may be used. The hard drive 415 need not necessarily be contained within the computer system 400. For example, in some embodiments the hard drive 415 may be server storage space within a network that is accessible to the computer system 400 for the storage and retrieval of data, computer programs or other information. In some instances the computer system 400 may use storage space at a server storage farm, or like type of storage facility, that is accessible by the Internet 424 or other communications lines. The hard drive 415 is often used to store the software, instructions and programs executed by the computer system 400, including for example, all or parts of the computer application program for carrying out activities of the various embodiments.

The communication link 404 may be used to access the contents of the hard drives 415 and optical disk drives 417. The communication links 404 may be point-to-point links such as Serial Advanced Technology Attachment (SATA) or a bus type connection such as Parallel Advanced Technology Attachment (PATA) or Small Computer System Interface (SCSI), a daisy chained topology such as IEEE-1394, a link supporting various topologies such as Fibre Channel, or any other computer communication protocol, standard or proprietary, that may be used for communication to computer readable medium. The memory/bus controller may also provide other I/O communication links 404. In some embodiments, the links 404 may be a shared bus architecture such as peripheral component interface (PCI), microchannel, industry standard architecture (ISA) bus, extended industry standard architecture (EISA) bus, VERSAmoduleEurocard (VME) bus, or any other shared computer bus. In other embodiments, the links 404 may be a point-to-point link such as PCI-Express, HyperTransport, or any other point-to-point I/O link. Various I/O devices may be configured as a part of the computer system 400.

In many embodiments, a network interface 414 may be included to allow the computer system 400 to connect to a network 427 or 431. Either of the networks 427 and 431 may operate in accordance with standards for an IEEE 802.3 ethernet network, an IEEE 802.11 Wi-Fi wireless network, or any other type of computer network including, but not limited to, LANs, WAN, personal area networks (PAN), wired networks, radio frequency networks, powerline networks, and optical networks. A network gateway 433 or router, which may be a separate component from the computer system 400 or may be included as an integral part of the computer system 400, may be connected to the networks 427 and/or 431 to allow the computer system 400 to communicate with the Internet 424 over an internet connection such as an asymmetric digital subscriber line (ADSL), data over cable service interface specification (DOCSIS) link, T1 or other internet connection mechanism. In other embodiments, the computer system 400 may have a direct connection to the Internet 424. The computer system 400 may be connected to one or more other computers such as desktop computer 441 or laptop computer 443 via the Internet 424, an intranet 431, and/or a wireless node 445. In some embodiments, an expansion slot 421 may be included to allow a user to add additional functionality to the computer system 400.

The computer system 400 may include an I/O controller 423 providing access to external communication interfaces such as universal serial bus (USB) connections, serial ports such as RS-232, parallel ports, audio in and audio out connections, the high performance serial bus IEEE-1394 and/or other communication links. These connections may also have separate circuitry in some embodiments, or may be connected through a bridge to another computer communication link provided by the I/O controller 423. A graphics controller 425 may also be provided to allow applications running on the processor 401 to display information to a user. The graphics controller 425 may output video through a video port that may utilize a standard or proprietary format such as an analog video graphic array (VGA) connection, a digital video interface (DVI), a digital high definition multimedia interface (HDMI) connection, or any other video connection. The video connection may connect to display 437 to present the video information to the user.

The display 437 may be any of several types of displays or computer monitors, including a liquid crystal display (LCD), a cathode ray tube (CRT) monitor, on organic light emitting diode (OLED) array, or other type of display suitable for displaying information for the user. The display 437 may include one or more light emitting diode (LED) indicator lights, or other such display devices. Typically, the computer system 400 includes one or more user input/output (I/O) devices such as a keyboard and mouse 434, and/or other means of controlling the cursor represented including but not limited to a touchscreen, touchpad, joystick, trackball, tablet, or other device. The user I/O devices 435 may connect to the computer system 400 using USB interfaces or other connections such as RS-232, PS/2 connector or other interfaces. Various embodiments include input devices configured to accept an input from a user and/or provide an output to a user. For example, some embodiments may include a webcam (e.g., connected via USB), a microphone (e.g., connected to an audio input connection), and/or speakers (e.g., connected to an audio output connection). The computer system 400 typically has a keyboard and mouse 434, a monitor 437, and may be configured to include speakers, microphone, and a webcam. These input/output devices may be used in various combinations, or separately, as means for presenting information to the user and/or receiving information and other inputs from a user to be used in carrying out various programs and calculations. Speech recognition software may be used in conjunction with the microphone to receive and interpret user speech commands.

The computer system 400 may be suitable for use in identifying critical web services and dynamically relocating them to a new server. For example, the processor 401 may be embodied as a microprocessor, microcontroller, DSP, RISC processor, two or more parallel processors, or any other type of processing unit that one of ordinary skill would recognize as being capable of performing or controlling the functions, steps, activities and methods described herein. A processing unit in accordance with at least one of the various embodiments can operate computer software programs stored (embodied) on non-transitory computer-readable medium such those compatible with the disk drives 415, the optical disk drive 417 or any other type of hard disk drive, floppy disk, flash memory, RAM, or other computer readable medium as recognized by those of ordinary skill in the art.

As will be appreciated by those of ordinary skill in the art, aspects of the various embodiments may be embodied as a system, method or computer program product. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "circuit," "module," "logic" or "system." Furthermore, aspects of the various embodiments may take the form of a computer program product embodied in one or more computer readable medium(s) having computer readable program code stored thereon.

Any combination of one or more non-transitory computer readable medium(s) may be utilized. The computer readable medium is typically a computer readable storage medium. A computer readable storage medium may be embodied as, for example, an electronic, magnetic, optical, electromagnetic, infrared, or semiconductor system, apparatus, or device, or other like storage devices known to those of ordinary skill in the art, or any suitable combination of the foregoing. Examples of such computer readable storage medium include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations and aspects of the various embodiments may be written in any combination of one or more programming languages, including an object oriented programming language such as Java, Smalltalk, C++, or the like, and conventional procedural programming languages, such as the "C" programming language or similar programming languages. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus, systems, and computer program products according to various embodiments disclosed herein. It will be understood that blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, a programmable data processing apparatus, or other such devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur in an order other that that depicted in the figures. For example, two blocks shown in succession may, in fact, be executed substantially concurrently, or the blocks and activities of the figures may sometimes be executed in reverse order or in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "obtaining", as used herein and in the claims, may mean either retrieving from a computer readable storage medium, receiving from another computer program, receiving from a user, calculating based on other input, or any other means of obtaining a datum or set of data. The term "plurality", as used herein and in the claims, means two or more of a named element. It should not, however, be interpreted to necessarily refer to every instance of the named element in the entire device. Particularly, if there is a reference to "each" element of a "plurality" of elements, there may be additional elements in the entire device that are not to be included in the "plurality" and are not, therefore, referred to by "each."

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

What is claimed is:

1. A method of reducing complexity of a digital circuit comprising:
   providing circuitry for analysis comprising a plurality of cells, wherein at least some of the plurality of cells have an unknown function;
   categorizing each of the plurality of cells as either a combinational cell or a state cell, wherein the plurality of cells comprise a plurality of combinational cells and a plurality of state cells;
   identifying by a computer a first combinational cell group among the plurality of combinational cells that each affect a same portion of the plurality of state cells; and
   replacing the first combinational cell group with a first cloud.

2. The method of claim 1, further comprising:
   identifying a plurality of buffers within said plurality of cells; and
   replacing said plurality of buffers with a single buffer cell.

3. The method of claim 2, wherein the identifying of said plurality of buffers is based on identifying cells having only a single input and a single output.

4. The method of claim 1, wherein the providing of the circuitry comprises:
   selecting the circuitry from a netlist that characterizes said digital circuit.

5. The method of claim 4, wherein the netlist is an original netlist, the method further comprising:
   including said first cloud in a reduced-size netlist smaller than said original netlist that characterizes said digital circuit;
   wherein the first cloud replaces the first combinational cell group in said reduced size netlist.

6. The method of claim 1, further comprising:
   including said first cloud in a reduced size netlist that characterizes said digital circuit; and
   using said reduced size netlist to analyze circuitry functions of said digital circuit for determining a function of cells having an unknown function.

7. The method of claim 1, wherein the plurality of state cells includes a first state cell and a second state cell; and wherein the first combinational cell group is defined to consist of cells that affect only inputs of both the first state cell and the second state cell.

8. The method of claim 7, further comprising:
   defining a second combinational cell group to consist of cells that affect only inputs of the first state cell.

9. The method of claim 8, further comprising:
   replacing the second combinational cell group with a second cloud; and
   including said second cloud in a reduced-size netlist that characterizes said digital circuit.

10. A computer program product comprising computer instructions stored on a nontransitory computer readable medium for reducing complexity of a digital circuit, said computer instructions upon being executed on a computer are configured to perform activities comprising:
    providing circuitry for analysis comprising a plurality of cells, wherein at least some of the plurality of cells have an unknown function;
    categorizing each of the plurality of cells as either a combinational cell or a state cell, wherein the plurality of cells comprise a plurality of combinational cells and a plurality of state cells;
    identifying a first combinational cell group among the plurality of combinational cells that each affect a same portion of the plurality of state cells; and
    replacing the first combinational cell group with a first cloud.

11. The computer program product of claim 10, further comprising:
    identifying a plurality of buffers within said plurality of cells; and
    replacing said plurality of buffers with a single buffer cell.

12. The computer program product of claim 11, wherein the identifying of said plurality buffers is based on identifying cells having only a single input and a single output.

13. The computer program product of claim 10, wherein the providing of the circuitry comprises:
    selecting the circuitry from a netlist that characterizes said digital circuit.

14. The computer program product of claim 13, wherein the netlist is an original netlist, the method further comprising:
    including said first cloud in a reduced-size netlist smaller than said original netlist that characterizes said digital circuit;
    wherein the first cloud replaces the first combinational cell group in said reduced size netlist.

15. The computer program product of claim 10, further comprising:
    including said first cloud in a reduced-size netlist that characterizes said digital circuit; and
    using said reduced size netlist to analyze circuitry functions of said digital circuit for determining a function of cells having an unknown function.

16. The computer program product of claim 10, wherein the plurality of state cells includes a first state cell and a second state cell; and wherein the first combinational cell group is defined to consist of cells that affect only inputs of both the first state cell and the second state cell.

17. The computer program product of claim 10, further comprising:
    defining a second combinational cell group to consist of cells that affect only inputs of the first state cell.

18. The computer program product of claim 17, further comprising:
    replacing the second combinational cell group with a second cloud; and
    including said second cloud in a reduced-size netlist that characterizes said digital circuit.

* * * * *